Nov. 2, 1943.  E. Z. GALEA  2,333,307
MEASURING AND DRAFTING INSTRUMENT
Filed Jan. 30, 1942  2 Sheets-Sheet 1

INVENTOR
EDWARD.Z.GALEA
BY Fetherstonhaugh & Co.
ATTORNEYS

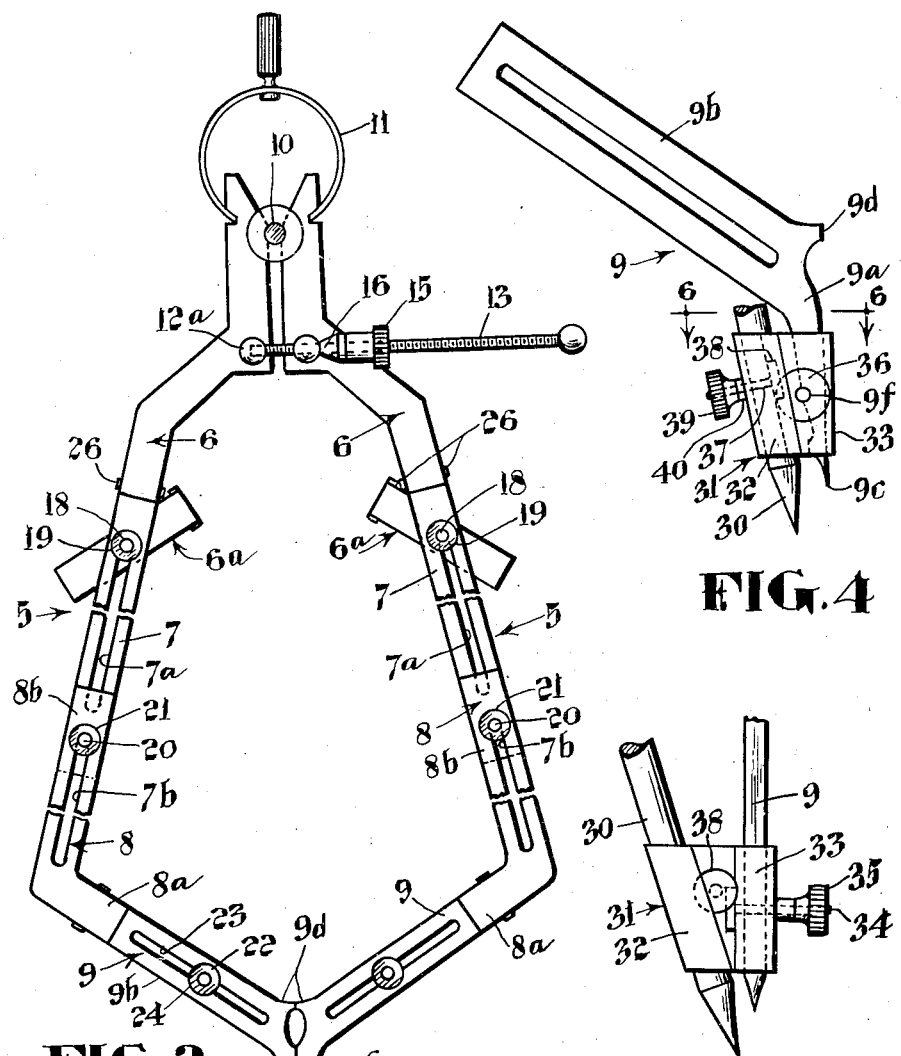

Patented Nov. 2, 1943

2,333,307

UNITED STATES PATENT OFFICE 2,333,307

MEASURING AND DRAFTING INSTRUMENT

Edward Z. Galea, Montreal, Quebec, Canada

Application January 30, 1942, Serial No. 428,924

2 Claims. (Cl. 33—152)

This invention relates to improvements in combination measuring and drafting instruments and is a continuation, in part, of the invention described and claimed in my co-pending application Serial No. 425,167, filed December 31, 1941.

The main object of the present invention is to provide a combination measuring instrument which has a wider range of adjustment and usefulness as compared with the instrument disclosed in said prior application.

Other objects, advantages and characteristic features of the invention are fully set forth in the detailed description of the accompanying drawings, in which—

Fig. 2 is a view similar to Fig. 1 but showing the component parts in a different position illustrating the maximum range of adjustment obtained by relative sliding movement of said parts.

Figs. 4, 5 and 6 are detail views showing the pencil holder attached to one of the measuring tips of the instrument appearing in the preceding figures.

Figure 1:
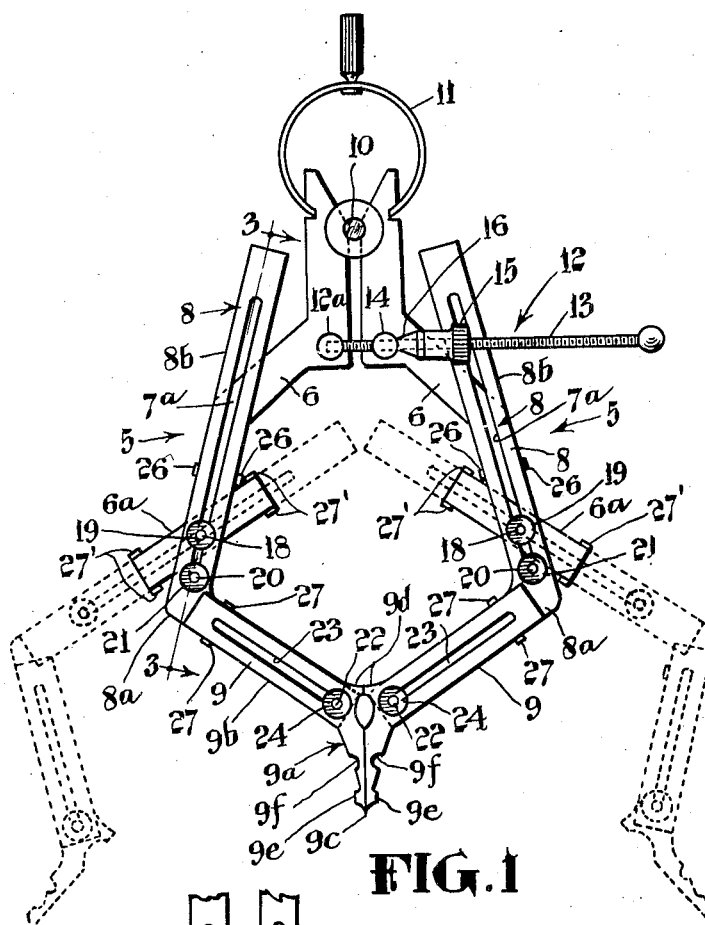
Fig. 1 is a front elevational view of my improved instrument. In this view the full lines indicate the normal arrangement of the component parts of the instrument while the dotted lines indicate an adjusted arrangement.

As shown in these drawings, my improved instrument comprises a pair of pivotally connected legs 5, each comprising an upper or main leg section 6 and a plurality of slotted extension sections designated 7, 8 and 9, the section 9 constituting the lower or tip section of the leg. The main leg sections 6 are pivotally connected together along their upper ends by a pivot 10, the portions of said leg sections which project above the pivot being engaged by the ends of a spring 11 which normally tends to swing the lower ends of the leg sections 6 outwardly with respect to each other. A suitable adjusting means, generally indicated at 12, is provided to control the extent to which the lower ends of the leg sections 6 are separated from each other by the action of the spring 11. As here shown, said adjusting means comprises a screw threaded rod 13 which passes slidably through a guide 14 carried by one of the leg sections 6 and has one end secured to a swivel member 12a carried by the remaining leg section 6. An adjusting nut 15 is movable along the rod 13 and is arranged to bear against a washer 16 which is interposed between said nut and the guide 14. When the nut 15 is moved toward the outer end of rod 13 it permits separation of the lower ends of the leg sections 6 by the spring 11. When the nut 15 is moved toward the guide 14 it serves to close the leg sections 6 against the resistance of the spring 11. The lower end of each leg section 6 terminates in an oblique inclined cross head 6a which provides an elongated bearing surface for the extension leg sections 7, 8 and 9 when the latter are arranged in the dotted line position shown in Fig. 1.

Figure 3:
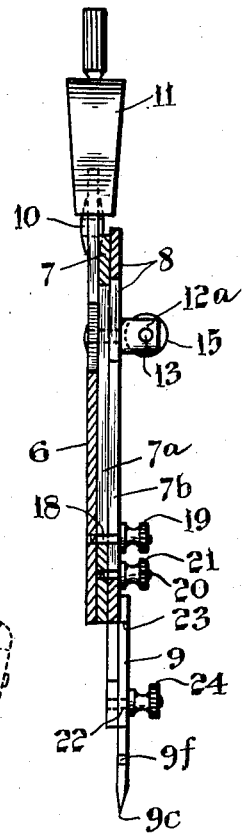
Fig. 3 is a sectional view along the line 3—3 of Fig. 1.

The sections 6, 7 and 8 of each leg 5 are normally arranged as indicated by full lines in Figs. 1 and 3. In this position of the parts a threaded stud 18, carried by leg section 6, projects through longitudinally extending slots 7a and 7b provided, respectively, in the extension sections 7 and 8. A clamping nut 19 is threaded onto the free end of the stud 18 and into clamping engagement with the leg section 8 so as to normally retain the leg sections 6, 7 and 8 in the position shown in Figs. 1 and 3. A second threaded stud 20 carried by the leg sections 7 extends outwardly through the slots 7b of the leg 8 and is fitted at its outer end with a clamping nut 21 normally disposed in clamping engagement with said leg sections 8. A third threaded stud 22, carried by the leg section 8, projects outwardly through a slot 23 provided in the leg section 9 and is fitted at its outer end with a clamping nut 24.

When the extension sections 7 and 8 of each leg 5 are positioned as shown by full lines in Figs. 1 and 3, they lie between guide lugs 26 which are formed integral with the leg section 6 and are located a slight distance above the cross head 6a. When the extension sections 7 and 8 of each leg 5 are in this position the guide lugs 26 hold them against swinging movement about the pivotal axis afforded by the stud 18.

It will be noted that each leg section 8 is a substantially L-shaped member presenting a relatively short arm 8a and a relatively long arm 8b, the latter being normally positioned on the leg sections 6 and 7 so that it is held against swinging movement by the lugs 26.

Each leg section 9 is provided with a tip portion 9a which extends at an angle to the shank portion 9b in which the slot 23 is formed. The tip portion 9a of each leg section 9 terminates in a pointed end 9c and is also shaped to provide an upper inwardly directed lug 9d and a lower outwardly directed lug 9e. The tip portion 9a of each leg extension 9 is also provided with a notch 9f for a purpose hereinafter referred to.

The effective length of each leg 5 may be increased to a substantial extent by backing off the clamping nut 19 and sliding both leg sections 7 and 8 downwardly until the upper ends of the slots 7a and 7b are brought against the stud 18, the nut 19 being then screwed up tight to hold the leg sections 7 and 8 in their new or adjusted position. Following this adjustment the length of each leg may be further increased by removing both of the clamping nuts 19 and 21, lifting the leg section 8 clear of the leg section 7 and the studs 18 and 20 and then re-applying the leg section 8 to the leg section 7 so that only the stud 20 is received through the slot 7b of leg section 8, the nuts 19 and 21 being then re-applied. This last mentioned rearrangement of the parts is illustrated in Fig. 2, wherein the leg sections 7 are shown in their lowermost positions with the leg sections 8 superimposed thereon so that only the stud 20 extends through the slots 7b.

In addition to the previously mentioned sliding adjustments it will be apparent that various other relative sliding and angular adjustments of the sections 6, 7 and 8 of each leg 5 may be resorted to to facilitate the measurement of articles of various sizes and shapes or the inscribing of circles of various diameters. For example, the sections 7 and 8 of each leg may be moved downwardly until their upper ends are below the lugs 26 and may then be swung to any desired angular position about the pivotal axis afforded by the stud 18, one said angular position of adjustment being indicated by dotted lines in Fig. 1. It will also be apparent that, when the sections of each leg are extended as shown in Fig. 2 the section 7 may be swung about the stud 18 to various angular positions with respect to section 6; section 8 may be swung about the stud 20 to various angular positions with respect to section 7 and section 9 may be swung about stud 22 to various angular positions with respect to the arm 8a of section 8. These possible relative arrangements of the component sections of each leg enables the instrument to be used for making measurements and doing other work that would ordinarily require the use of 5 or 6 different caliper-type measuring instruments. The sharp points 9c of the leg sections 9 enable the instrument described herein to be used as dividers for measuring distances. The outwardly directed lugs 9e of the leg sections 9 enable the instrument to be used as inside calipers while the inwardly directed lugs 9d enable the instrument to be used as outside calipers.

The cross heads 6a of the leg sections 6 are provided with lugs 27' similar to the lugs 26. These lugs 27' serve to hold the leg sections 7 and 8 parallel with the cross heads when said leg sections are positioned between the lugs of each pair as indicated, for example, by the dotted lines in Fig. 1. Similar lugs 27 are provided on the shorter arms of the leg sections 8 to hold the leg sections 9 against swinging movement when the latter leg sections are positioned as indicated by dotted lines in Fig. 1.

When the instrument described herein is to be used for scribing purposes it may be equipped with a pencil 30 held in a pencil holder 31 which is removably clamped to the tip portion 9a of one of the leg sections 9 (see Figs. 4 to 6 inclusive). In the present instrument I have shown a pencil holder formed from a single piece of metal which is bent to provide a split pencil clamp 32 formed integral with a U-shaped portion 33. The U-shaped portion 33 is fitted over the tip portion of the leg sections 9 and is secured in place by suitable clamping means comprising a threaded stud 34 and a clamping nut 35. The stud 34 passes through the sides of the U-shaped clamping portion 33 and through the notch 9f of the leg section 9 and is provided, at the end remote from the clamping nut 35, with an enlarged head 36. A second stud 37 passes through the split pencil clamp 32 and is provided at one side of said clamp with an enlarged head or plate 38. At the side of the pencil clamp remote from the head 38 the stud 37 is fitted with a clamping nut 39 which bears against a washer 40. The pencil gripping or clamping portion 32 of the pencil holder is preferably obliquely inclined as shown in Figs. 4 to 6 inclusive.

Figure 7:
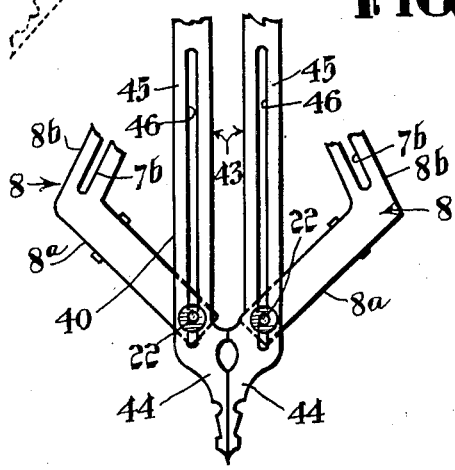
Fig. 7 is a view showing a slight modification of the instrument appearing in Figs. 1 to 3 inclusive.

In Fig. 7 I have shown a slight modification in which the section 9 of each leg is replaced by a section 43 provided with a tip portion 44 which lies parallel with the shank portion 45, the latter being provided with a slot 46 accommodating the stud 22 of the associated leg section 8.

Having thus described my invention, what I claim is:

1. An instrument of the character described comprising a pair of sectional leg members pivotally connected together adjacent their upper ends, each leg member including an upper main section and at least one extension section slidably and pivotally connected to said main section, the lower end of each main section being formed to provide an obliquely inclined cross head and being provided with a pivot pin extending from the central portion of the cross head through an elongated slot formed in the associated extension section, said pivot being provided with a clamping nut threaded onto the free end thereof.

2. An instrument as set forth in claim 1 including guide lugs carried by the cross head of each main leg section and adapted to engage opposite side edges of the associated extension section when the latter is arranged on said cross head in a position parallel thereto.

EDWARD Z. GALEA.